Sept. 29, 1936.  H. A. BRITTAIN  2,056,131
PNEUMATIC TIRE
Filed April 18, 1934   2 Sheets-Sheet 1
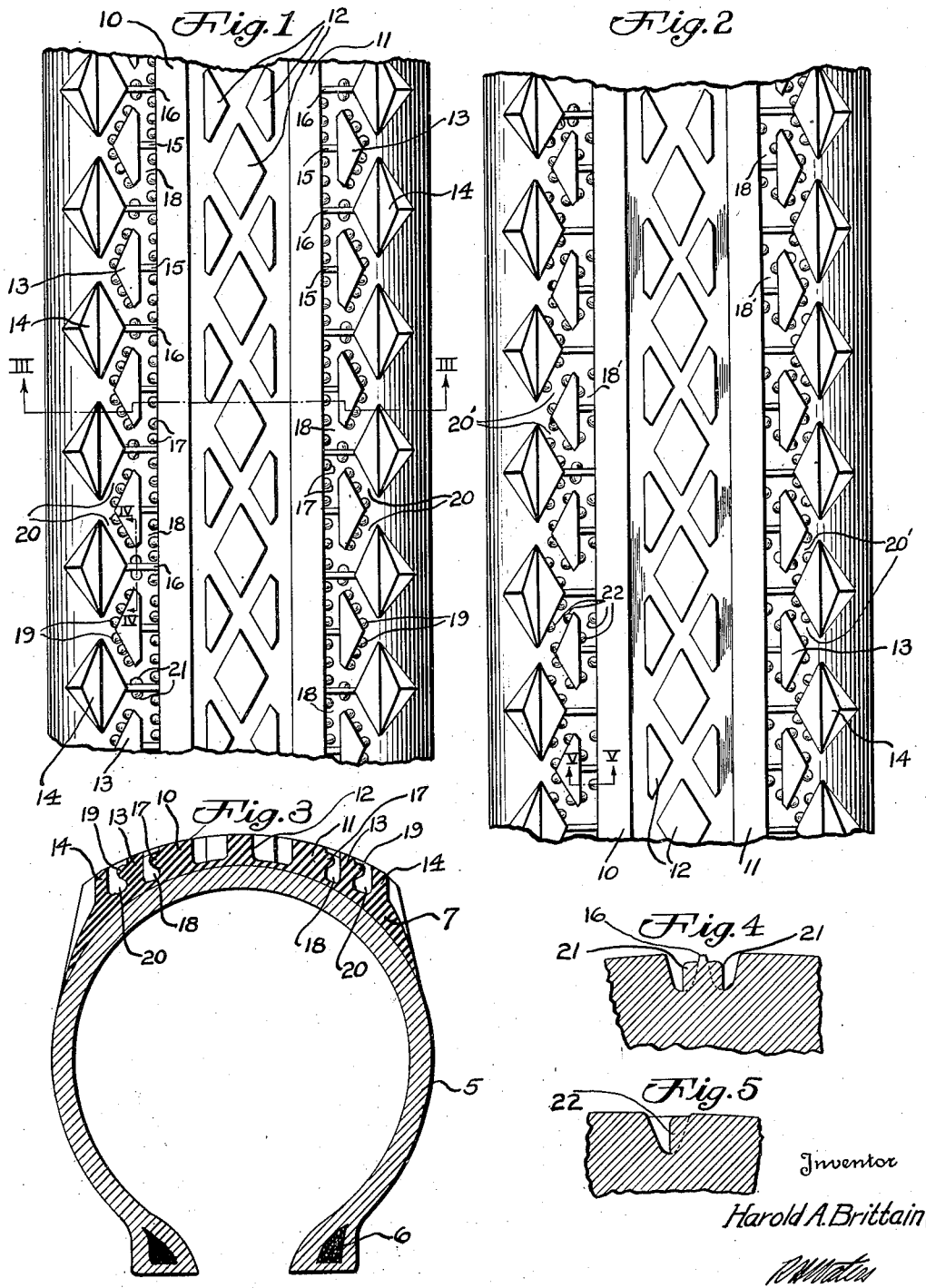
Inventor
Harold A. Brittain
By
Attorney Sept. 29, 1936.   H. A. BRITTAIN   2,056,131
PNEUMATIC TIRE
Filed April 18, 1934    2 Sheets—Sheet 2
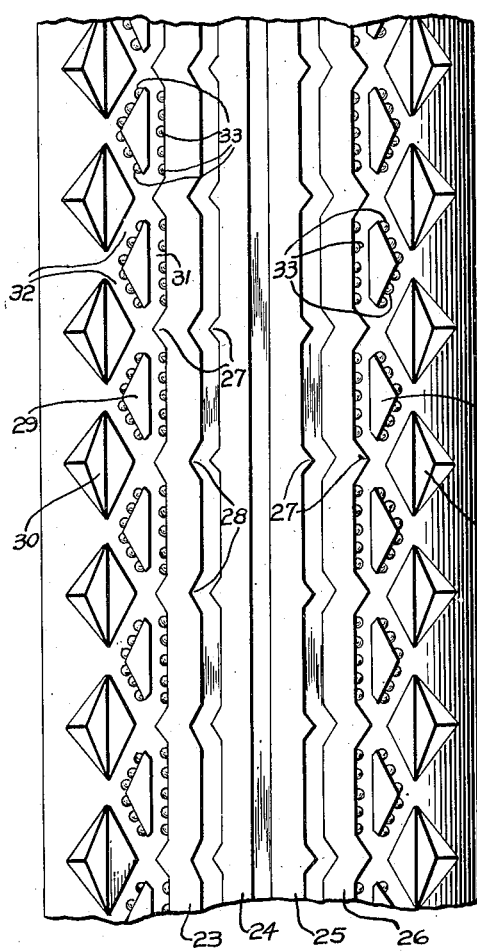
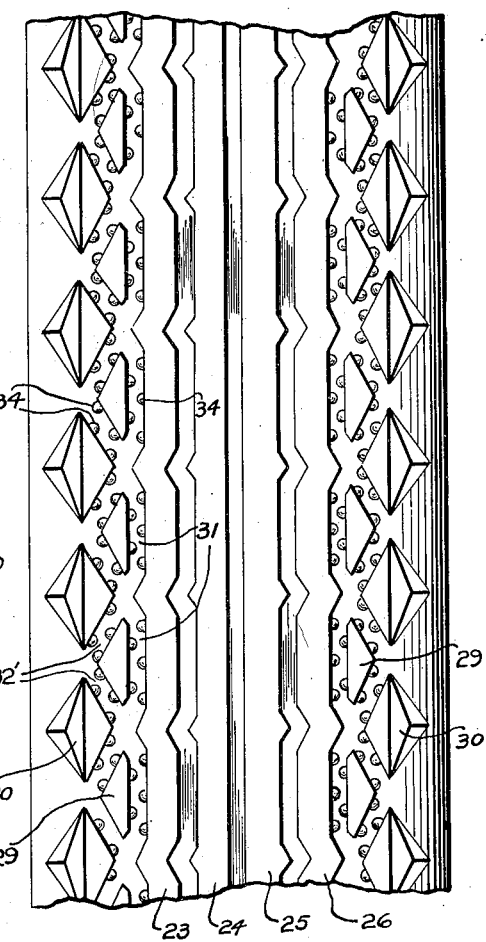
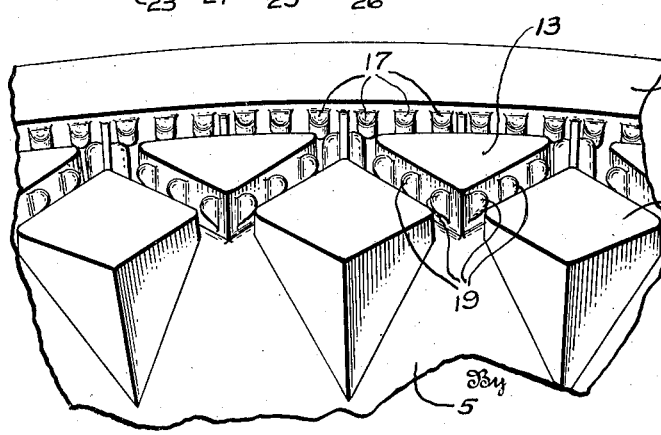
Inventor
Harold A Brittain Patented Sept. 29, 1936

2,056,131

UNITED STATES PATENT OFFICE 2,056,131

PNEUMATIC TIRE

Harold A. Brittain, Akron, Ohio, assignor to Wingfoot Corporation, Wilmington, Del., a corporation of Delaware Application April 18, 1934, Serial No. 721,115

2 Claims. (Cl. 152—14)

This invention relates to improvements in pneumatic tires and it relates more particularly to the provision of means for overcoming the tendency of such tires when in use on a vehicle to pick up gravel and other small objects which are subsequently thrown from the tire by centrifugal force.

Since the advent of pneumatic tires having traction and non-skid tread surfaces formed with spaced buttons, blocks, ribs and the like having grooves therebetween, such grooves, more particularly on the shoulder portions of the tire, have a tendency to pick up small objects such as gravel and to discharge such objects with considerable force against the fenders and body of the vehicle. As a result small dents and other unsightly marks appear on the vehicle and a disturbing noise is caused by the impinging of these objects against the fenders. Also these objects are frequently thrown into the path of other vehicles causing damage to headlights, windshields and other readily breakable parts.

Gravel throwing might be overcome to a considerable extent by using smooth tread tires, but the advantages of using traction and non-skid treads are so numerous that tire and vehicle manufacturers are not willing to subject users to the hazardous risks encountered with smooth tires merely to control gravel throwing. Therefore it is desirable to retain the advantages of the traction and non-skid treads while controlling the gravel throwing tendencies of a tire and one of the objects of this invention is to provide a tire of this character with which gravel throwing is substantially, if not completely, eliminated.

Another object is to provide a tire wherein the grooves of the tread design on the shoulder portions of the tire at least, have protuberances projecting thereinto to reduce the size of the grooves thereby making it more difficult for the grooves to pick up small objects.

Other objects and advantages of the invention will become apparent from the following description in conjunction with the accompanying drawings wherein I have shown several embodiments of the invention. In this showing Fig. 1 is a plan view of a portion of a pneumatic tire showing the preferred arrangement of the protuberances, Fig. 2 is a similar view with a modified arrangement of the protuberances, Fig. 3 is a sectional view taken substantially on line III—III of Fig. 1, Fig. 4 is an enlarged sectional view taken substantially on line IV—IV of Fig. 1, Fig. 5 is a similar view taken substantially on line V—V of Fig. 2, Fig. 6 and Fig. 7 are partial plan views showing the arrangement of the protuberances on a different tread design, and Fig. 8 is an enlarged partial perspective view illustrating the arrangement shown in Fig. 1.

In practicing the invention I have incorporated one form which it may assume in Figs. 1 and 3 wherein is provided a tire casing 5 having beads 6 and a rubber tread portion 7. It will be understood that the casing 5 is formed with the customary rubberized fabric plies, chafing strips, a breaker strip and other conventional elements but these need not be illustrated in order to understand the invention. In Figs. 1, 2, and 3 it will be noted that I have illustrated the invention in connection with a well known tire tread and the form shown in Fig. 2 is a slightly modified embodiment of the invention shown in Figs. 1 and 3.

Referring to Figs. 1 and 3 the tread is formed with two circumferential ribs 10 and 11, which are disposed at the circumferential shoulders of the tire. Centrally of the tread, between the ribs 10 and 11 a plurality of non-skid traction elements 12, arranged in staggered relation, are formed, whose outer surfaces are substantially of the same height in relief as the surfaces of the circumferential ribs. In this instance the elements 12 are substantially of diamond and triangular shapes. Additional rows of non-skid traction elements 13 and 14 are arranged outwardly of the ribs 10 and 11 and the elements 13 with these ribs form the circumferential shoulder portions of the tire, As shown, the elements 13 preferably are substantially triangular in shape while elements 14 comprise a plurality of geometric forms blending into substantially arrow-headlike figures, as clearly shown in Fig. 8. Transverse ribs 15 are arranged between elements 13 and the circumferential ribs and transverse ribs 16 are arranged between elements 14 and the circumferential ribs.

On their outer sides ribs 10 and 11 are provided with a plurality of spaced semi-spherical protuberances 17 which project toward the elements 13 and 14 and reduce the size of the grooves 18 between these elements and the ribs. Similar protuberances 19 are arranged in spaced relation on the short sides of the triangular elements 13 and project into grooves 20 for a similar purpose. A slightly different form of protuberance 21 is arranged on each side of each transverse rib 16 (see Fig. 4), this form of protuberance extending to the bottom of the adjacent grooves from points slightly below the outer surface of the ribs.

It will be observed that the foregoing arrangement of protuberances substantially reduces the size of the grooves on the shoulder portions of the tire and retards the entrance of small objects into such grooves, while the traction and non-skid features of the tire are completely retained. Particular stress has been laid on the fact that the protuberances are preferably confined to the shoulder grooves and the reason for this is due to tests which have conclusively shown that the amount of gravel thrown by the grooves arranged centrally of the tread is negligible. This is easily understood when it is realized that the central grooves undergo very little change in dimension as they move into and out of engagement with the surface over which a vehicle is traveling. On the other hand, the shoulder grooves materially change in width as they approach and leave such surface. As the shoulder grooves approach the road surface they first increase in width and as the contact with the surface is made they decrease in width causing a pinching action of the tread elements which readily picks up small objects, such as gravel. Upon leaving the road surface these grooves again increase in width and as a result any small objects picked up will ordinarily be released and thrown from the tire. However, by providing the protuberances referred to herein I have substantially, if not completely, prevented the shoulder grooves from picking up objects since the presence of these protuberances makes it difficult for the objects to enter far enough into the grooves to be pinched therein.

In confining my protuberances to the shoulder portions of the tire, I do not mean to convey the impression that I may not also use same in the grooves of the central tread design if such an arrangement is found to be desirable. My tests so far, however, have indicated this to be unnecessary.

Referring to Figs. 2 and 5, I have shown a slightly modified form and arrangement of the protuberances 22, wherein the number of protuberances is reduced and each is elongated (see Fig. 5) to extend from slightly below the surface of the tread elements to the bottom of the intervening grooves. Also the protuberances 22 are arranged in staggered relation in the grooves 18' and 20' on opposite sides of the walls of these grooves.

The effectiveness of the protuberances is not peculiar to the particular tread design shown in Figs. 1 and 2, but may be used with many other designs, one of which I have shown for example in Figs. 6 and 7. In this showing the tread comprises a plurality of spaced circumferential ribs 23, 24, 25, and 26, with the outer ribs 23 and 26 disposed at the shoulders of the tire. Sharp lateral projections 27 are formed at spaced points on all these ribs, and on ribs 23 and 26 indentations 28 are formed opposite the projections. The traction non-skid elements 29 and 30 are completely isolated from the circumferential ribs thereby forming grooves 31 and 32 which will pick up objects if no protuberances are provided to prevent such action. However, by providing spaced protuberances 33 on the inner side of ribs 23 and 26 and on the short sides of triangular elements 29 and 30, similar to protuberances 17 and 19 in Fig. 1, the grooves 31 and 32 are effectively reduced in size to retard entrance of small objects, while the desirable features of the traction and non-skid design are retained.

Fig. 7 shows the protuberances 34, which preferably are similar to protuberances 22 in Fig. 2, arranged in staggered relation in the grooves 31' and 32'.

It is believed to be obvious that my invention provides a practical solution for eliminating the throwing of small objects by a tire when in use, while retaining all the desirable features of the traction and non-skid tread.

Although I have illustrated several forms of the invention, it will be apparent to those skilled in the art that the invention is not limited to such forms but that various modifications may be made without departing from the spirit of the invention or from the scope of the sub-joined claims.

What I claim is:

1. A pneumatic tire having projections thereon with grooves therebetween and pebble ejecting protuberances on the sidewalls of said grooves extending laterally of said grooves, the lower and upper sides of said protuberances being spaced respectively from the bottoms of said grooves and the upper edges thereof.

2. A pneumatic tire having a groove in the periphery thereof, and a pebble-ejecting portion running along and protruding laterally from a side wall of the groove, and having the upper and lower sides thereof spaced respectively from the top and bottom portions of the groove.

HAROLD A. BRITTAIN.